United States Patent
Mercouroff et al.

(10) Patent No.: US 6,201,862 B1
(45) Date of Patent: Mar. 13, 2001

(54) METHOD FOR PROVIDING AT LEAST ONE SERVICE TO USERS OF A TELECOMMUNICATION NETWORK, SERVICE CONTROL FACILITY AND SERVER NODE

(75) Inventors: Nicolas Mercouroff; Alban Couturier, both of Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/059,851

(22) Filed: Apr. 14, 1998

(30) Foreign Application Priority Data

Apr. 14, 1997 (EP) .................................................. 97440036

(51) Int. Cl.[7] .................................................... H09M 7/00
(52) U.S. Cl. ............................ 379/230; 379/221; 379/207
(58) Field of Search ..................................... 379/201, 207, 379/219, 220, 221, 229, 230

(56) References Cited

U.S. PATENT DOCUMENTS

| | | | |
|---|---|---|---|
| 5,455,854 | * 10/1995 | Dilts et al. ..................... | 379/93.17 X |
| 6,038,301 | * 3/2000 | Nightingale ......................... | 379/201 |
| 6,052,456 | * 4/2000 | Huang ................................. | 379/201 |

FOREIGN PATENT DOCUMENTS 9534175    12/1995    (WO) .

OTHER PUBLICATIONS

"Distribution of Service Data to Distributed SCPs in the Advanced IN", N. Kusaura et al, *Globecom 95*, Singapore, Nov. 14, 1995, pp. 1272–1276.

"Object–oriented Switching Software Technology", K. Maruyama, *IEICE Transactions on Communications*, Tokyo 1992, vol. E–75B, No. 10, pp. 957–968.

"Signalling in the Intelligent Network", M. Bale, *BT Technology Journal*, vol. 13, No. 2, Apr. 1995, Ipswich GB, pp. 30–42.

"Distributed Control Node Architecture in the Advanced Intelligent Network", M. Hirano et al, XV International Switching Symposium, Berlin, Apr. 23, 1995, pp. 278–282.

"CORBA: A Common Touch for Distributed Applications", F. Tibbits, *Data Communications*, vol. 24, No. 7, May 21, 1995, pp. 71–75.

"The Information Services Supermarket—an Information Network Prototype", I. Marshall et al, *BT Technology Journal*, vol. 13, No. 2, Apr. 1995, Ipswich GB, pp. 132–142.

* cited by examiner

*Primary Examiner*—Creighton Smith
(74) *Attorney, Agent, or Firm*—Ware, Fressola, Van Der Sluys & Adolphson LLP

(57) ABSTRACT

The invention concerns a method for providing a service for users of a telecommunication network. Service calls requesting the execution of the service for an respective one of the users are routed to a service switching exchange of the telecommunication network or are respectively routed to one of several service switching exchanges of the telecommunication network. A corresponding service request is sent by the respective service switching exchange, that has received the respective service call, to a service control facility or to one of several possible service control facilities. The service request is routed to a particular one of a plurality of servers of the service control facility, which are formed on top of an object infrastructure within an object oriented computing environment The particular server acts as service repository server and determines another one of the plurality of servers that is available and able to execute the control of the service for the respective service call.

22 Claims, 5 Drawing Sheets

Architecture 1

Architecture 2

Architecture 3

SSP Server

METHOD FOR PROVIDING AT LEAST ONE SERVICE TO USERS OF A TELECOMMUNICATION NETWORK, SERVICE CONTROL FACILITY AND SERVER NODE

CROSS-REFERENCE TO RELATED APPLICATION

This application discloses subject matter that is disclosed and which may be claimed in copending applications entitled, "Method for Communicating Between a Service Switching Exchange of a Telecommunication Network and a Service Control Facility", filed Apr. 9, 1998 (Atty. Docket 902-679); and "Method of Providing a Service to Users of a Telecommunication Network, Service Control Facility, and Processing Node", filed on even date herewith (Atty. Docket 902-682); both of which are hereby incorporated by reference.

BACKGROUND OF THE INVENTION

1. Technical Field

The invention concerns a method for providing at least one service to users of a telecommunication network, a method for provisioning the execution of service logic functions within a service control facility of a telecommunication systems, a service control facility for connecting to one or several service switching exchanges of a telecommunication network and a server node for a service control facility connected to one or several service switching exchanges of a telecommunication network.

2. Discussion of Related Art

Telecommunication services can be provided according to the Intelligent Network Architecture.

A user of a telecommunication network requests a service by dialing the number dedicated to the service. The call with this number is routed through the telecommunication network to a service switching exchange which recognizes this call as a call requesting the service. Then, this service switching exchange communicates via a data network with a service control facility, the so called service control point. This service control point contains a service logic which contains a description of the method that has to be executed to provide the service to the calling user. By a request of the service switching exchange the execution of this method by the service logic is initiated and the requested service is provided to the requesting user.

The service switching exchange is closely linked to a service control facility. The configuration of this link is made through basic proprietary tools provided by the service switching exchange/service control facility pair vendor and do not allow easy and dynamic configurations.

This service logic is realized as a single process handling all calls one after the other. Each of them going through a single queue. Each call is associated with a context allowing the state of the call not to be lost between user interaction. The service is executed through a finite state machine, taking as input the TCAP message and the context of the call.

The disadvantage of this approach is that this architecture of provisioning services is inflexible and does not make good use of the underlying data processing systems.

SUMMARY OF INVENTION

Accordingly, it is a primary objective of the present invention to improve the data processing characteristic of a service control facility.

A first aspect of the invention is a method for providing at least one service to users of a telecommunication network, in which method service calls requesting the execution of the service for an respective one of the users are routed to a service switching exchange of the telecommunication network or are respectively routed to one of several service switching exchanges of the telecommunication network. Also in this method of providing service, a corresponding service request is sent by the respective service switching exchange, that has received the respective service call, to a service control facility. This method is characterized in that the service request is routed to a particular one of a plurality of servers of the service control facility, which are formed on top of an object infrastructure within an object oriented computing environment. This method is also characterized in that the particular server acts as service repository server and determines another one of the plurality of servers that is available and able to execute the control of the service for the respective service call.

A second aspect of the invention is a method for provisioning the execution of service logic functions within a service control facility of a telecommunication system, where service requests, that request the execution of a service logic function, are received by the service control facility from at least one service switching exchange of the telecommunication system. This method is characterized in that the service request is routed to a particular one of a plurality of servers of the service control facility, which are formed on top of an object infrastructure within an object oriented computing environment. This method is also characterized in that the particular server acts as service repository server and determines another one of the plurality of servers that is available and able to execute the respective service request.

A third aspect of the invention is a service control facility for connecting to one or several service switching exchanges of a telecommunication network, where the service control facility contains means for receiving service requests, requesting execution of a service for a user of the telecommunication network from at least one of the service switching exchanges of the telecommunication network. This service control facility is characterized by containing a plurality of servers, which are formed on top of an object infrastructure within an object oriented computing environment, by containing means for routing the service request to a particular one of the service control facility, and by containing the particular server acting as service repository server and determining another one of the plurality of servers that is available and able to execute the respective service request.

A fourth aspect of the invention is a server node for a service control facility connected to one or several service switching exchanges of a telecommunication network, where the server node contains means for receiving service requests, requesting execution of a service for a user of the telecommunication network from at least one of the service switching exchanges of the telecommunication network. This server node is characterized in that the server node is formed on top of an object infrastructure within an object oriented computing environment, and contains means for determining another one of a plurality of server nodes which are formed on top of the object infrastructure within the object oriented computing environment. This server node is also characterized in that it is available and able to execute the respective service request.

The underlying idea of this invention is to implement each service that is offered by the service control facility by one or many servers, which are formed on top of an object infrastructure within an object oriented computing environment and to provide a particular server, a service repository server which determines the one of the servers that has to execute the service for an incoming service request.

Therefore, the service architecture is no longer based on a functional design and technologies like multithreading or multi processing can be applied. Further, an open way to distribute service execution united around one or several service switching exchanges is offered.

With the service repository server distribution is transparent and system configuration is very easily achieved through plug and play. The scalability of the system is ensured and easy to realize through an open interface.

The introduction of CORBA based distribution provides high scalability and IT platform independence. It allows for easy service interworking personalization, distribution and maintainability of the software.

In the approach where the link between the service control facility and the service switching exchange conforms to a OMG CORBA 2.0 specification, the configuration of processing nodes and of server nodes must take advantage of the underlying CORBA platform.

Due to the introduction of an object oriented computing environment and the special object design described above, the processing of the service requests can be distributed and this proved high scalability and IT platform independence. The redesign of the service logic according to this approach allows for easy service interworking personalization, distribution and maintainability of the software. The design pattern allows for taking all benefits from object oriented programming.

Furthermore, it allows introduction of multithreading. The direct benefit is that a service session, that means the processing of a service request, is not blocked by the execution of another one.

The use of a factory allows implementation of several life cycle policies for the service session objects.

It is further advantageous
  to manage the creation of a service session object by a service dedicated factory.
  to set the interface definition of a service session object as TCAP mapped over IDL. (Interface Definition Language which is used to describe the interface of an object in language-neutral terms).

By the use of CORBA servers the service control facility implementation is simplified and scalability is ensured.

These and other objects, features and advantages of the present invention will become more apparent in light of the detailed description of a best mode embodiment thereof, as illustrated in the accompanying drawing.

DETAILED DESCRIPTION OF PREFERRED EMBODIMENTS

Figure 1:
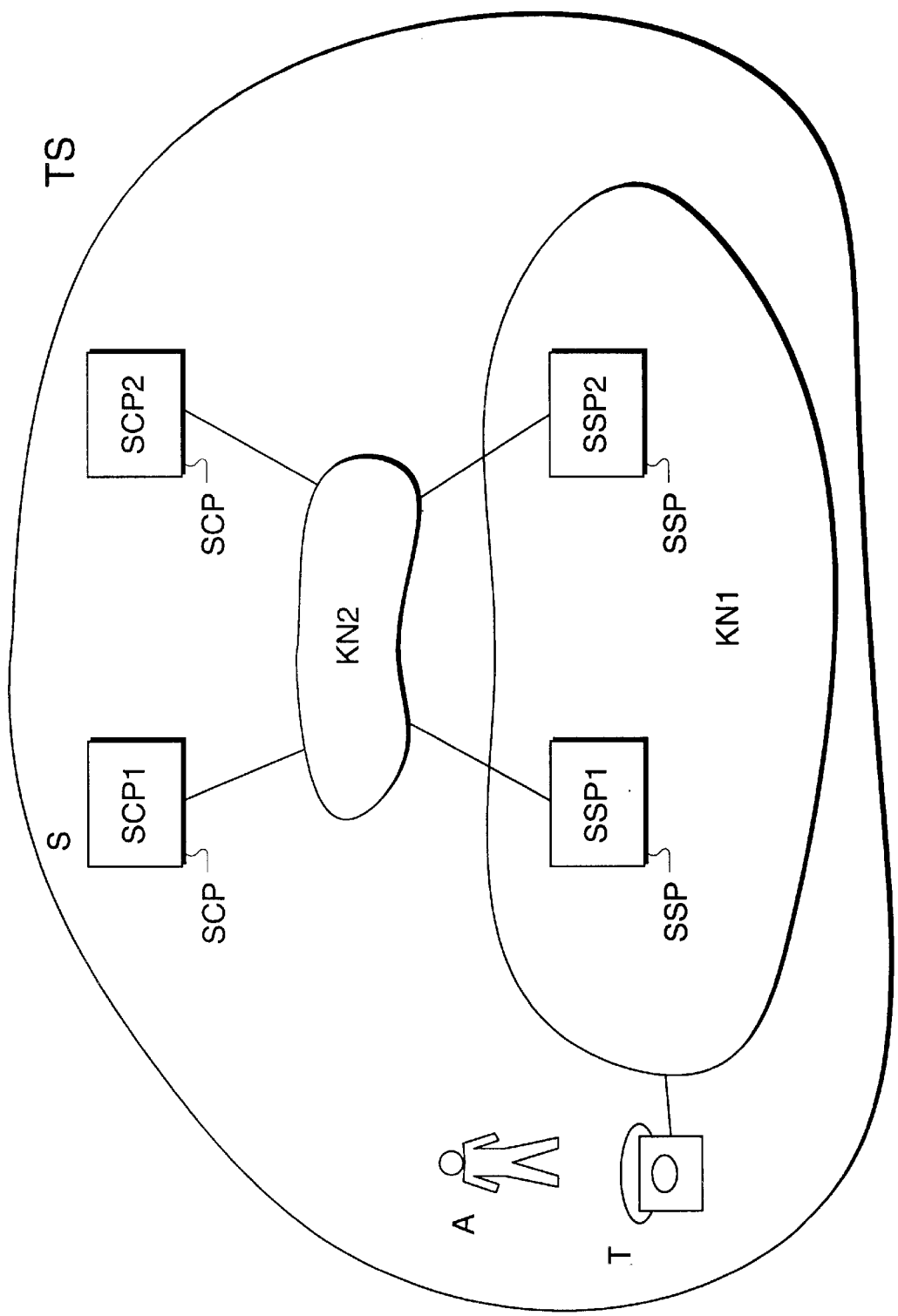
FIG. 1 is a block diagram presenting the architecture of a telecommunication system containing a service control facility according to the invention.

FIG. 1 shows a telecommunication system TS with an telecommunication network KN1, a subscriber terminal T assigned to a subscriber A, a communication network KN2 and two service control facilities SCP1 and SCP2.

The telecommunication network KN1 is for example a telephone network. It is also possible that this network is a data network or a communication network for mixed data speech and video transmission.

From the exchanges of the network KN1 two special designed exchanges SSP1 and SSP2 are shown. These exchanges are service switching exchanges that contain a service switching functionality SSP. To these exchanges service request calls from the subscriber of the network are routed. When such a service switching exchange receives such a service request, it sends a corresponding request via the network KN2 to one of the two service control facilities SCP1, SCP2. The service is then provided under the control of the respective one of the service control facilities SCP1 and SCP2.

Each of the service control facilities SCP1 and SCP2 provides one or several services S and realize a service control function.

The communication network KN2 is preferably a data network, especially according to the SS7 signaling protocol. It is also possible that this network is a LAN (Local Area Network), a MAN (Metropolitan Area Network) or an ATM (Asynchronous Transfer Mode) network.

Preferably, the service switching exchanges SSP1, SSP2, and the communication between them and the service control facilities SCP1, SCP2 are designed according to the Intelligent Network Architecture (according to the service switching point and according to the communication between the service switching point and the service control point), described for example in the ITU-T Q.1214 Recommendation.

If a user wants to start an service S, he dials a specific number for that service. The local exchange will route this call to the nearest service switching exchanges and this will trigger the service switching functionality SSP to start the service. This is done by sending a request to the SCP to start executing a Service Logic Program (SLP). An SLP is specific for each service, it will instruct the network on how to handle the service. It will execute service logic, statistic logic, database logic, charging logic, etc. It will also provide instructions for the switch (e.g., create the second leg of the call) and Intelligent Peripherals (IP) (e.g., announcement machines). A protocol according to the Information Networking Architecture (INAP) protocol is used for this, and INAP messages are transported in TCAP messages between the SCP and SSP.

When designing a distributed application, first the possible system components to be distributed are identified (i.e., what the objects of the system are and how they will be grouped into larger objects that will be distributed).

Figure 2:
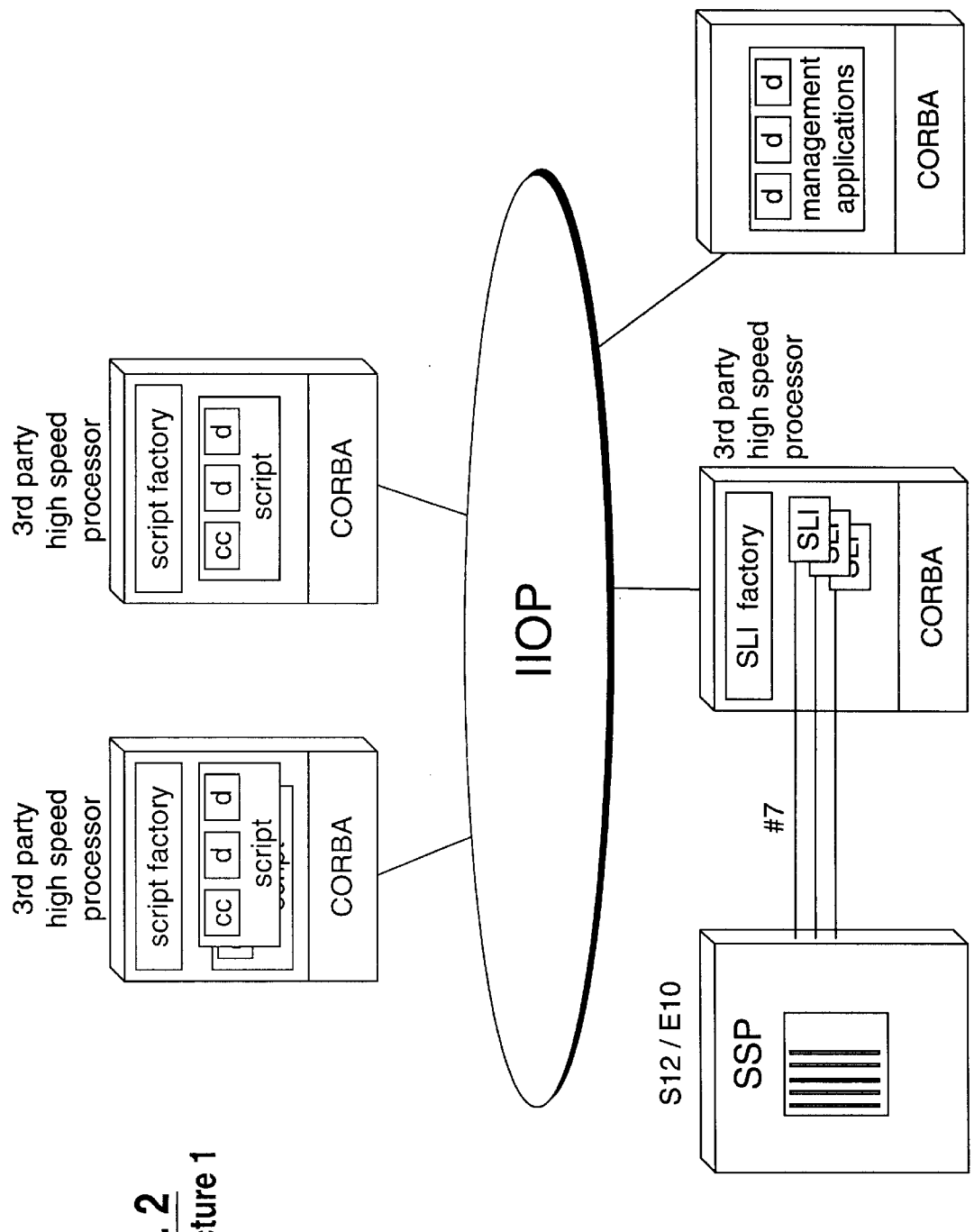
FIG. 2 is a block diagram presenting a first object architecture of the telecommunication system.
Figure 3:
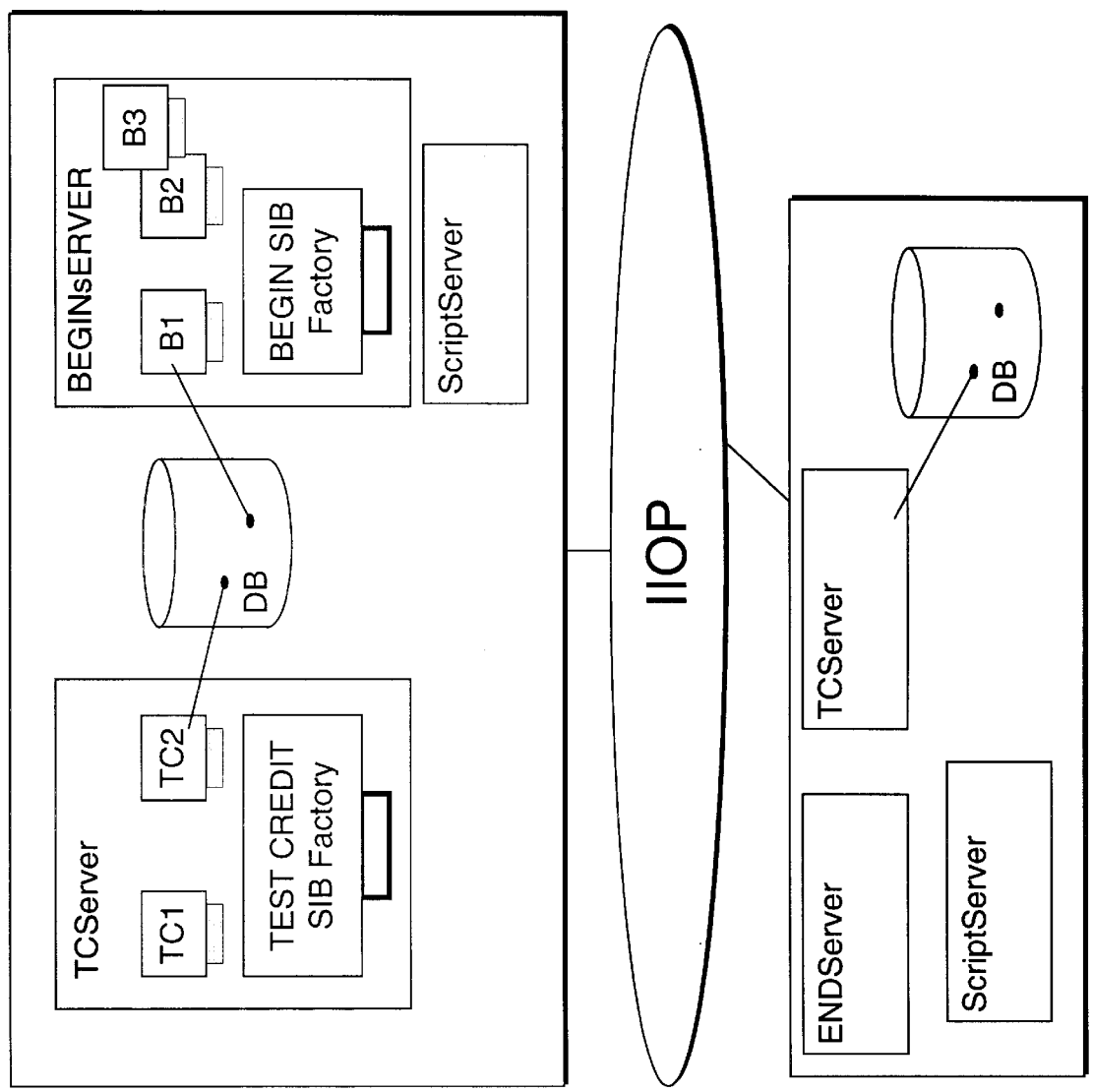
FIG. 3 is a block diagram presenting a second object architecture of the telecommunication system.
Figure 4:
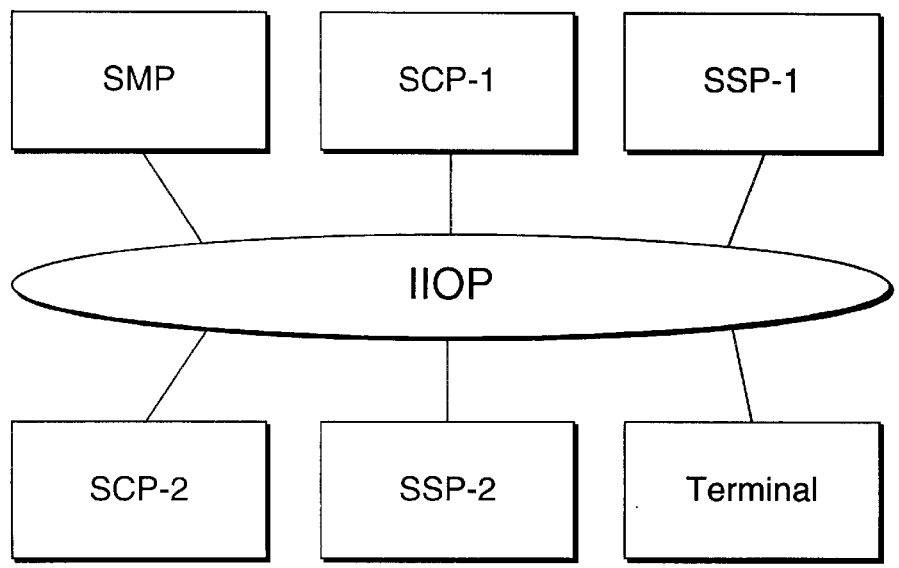
FIG. 4 is a block diagram presenting a third object architecture of the telecommunication system.

The breaking down of the SCP into objects offers some possibilities. FIGS. 2 to 3 depict these organized into different architectures. All state information for handling one call was kept together and that all needed data was organized into objects. So, one possibility for SCP objects is a script object that executes the service logic for one call and an object per data object.

The values of the data objects are kept in a database, so having data objects that hide the use of a database is preferable (i.e., certain independence on the database). The catch lies in the fact that making these objects CORBA objects gives us a considerable overhead when methods (e.g., to read or write attribute values) are called on them. So, the system performance would become unacceptable.

The script object could be decomposed into a service execution engine and an SIB graph. So, SIBs could become distributed objects too. If database objects are distributed, this offers the possibility to execute an SIB on the machine where the particular data object resides. We can envisage a scheme where there is a control entity (a script) that executes SIBs remotely (possibility of having more overhead) or a scheme where control is passed from SIB to SIB. This trade off between getting the data and running a script on one machine and running parts of a script (SIBs) where the data resides is certainly worth investigating.

Figure 5:
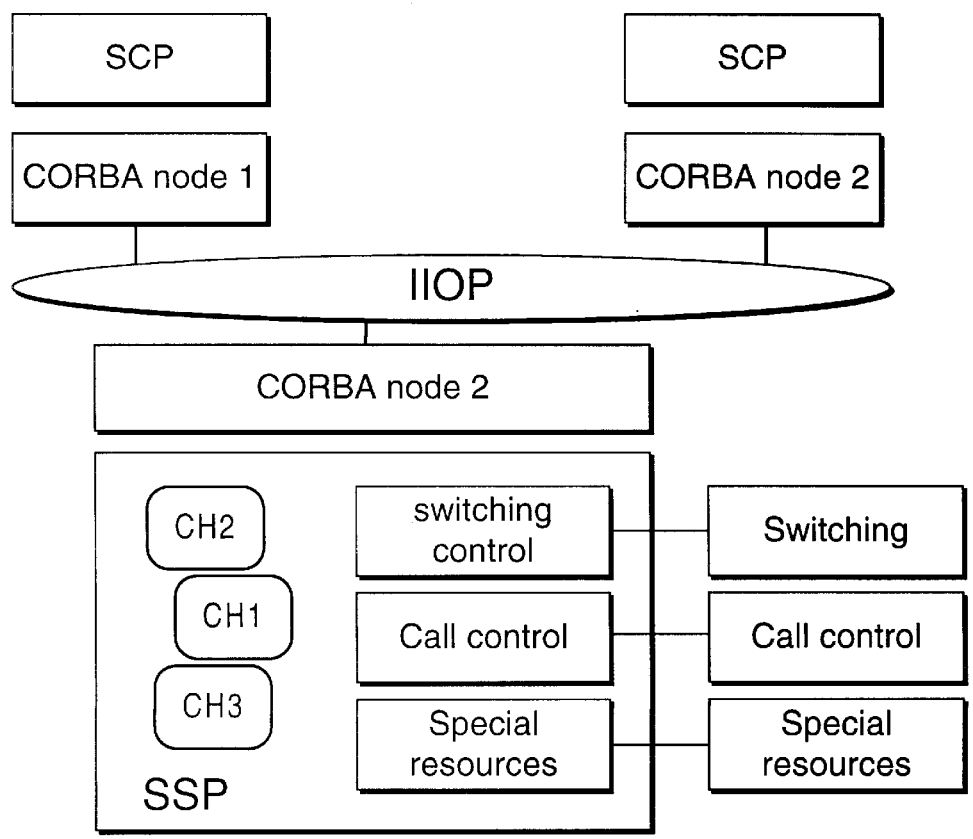
FIG. 5 is a block diagram presenting a object architecture of a service switching exchange for the telecommunication system.

The SSP's main functionality is to provide a hook between the call processing and the IN system. An SSP server must at least have an object that bridges between the normal Call Control Function (CCF) and an object that bridges between the Switching Function (SF). Also an object that bridges between Specialized Resources (SRF) (e.g., announcement equipment), seems to be obvious. In FIG. 5, these objects are depicted as a Switching Control, Call Control and Special Resources Object. We also need an object, Call Handler (CH) that interlaces with the SCP and the other objects in the SSP. There are two possibilities: there will be only one that handles all calls, or several, each handling one call. If we have several, existing only for the duration of the call, we also need a corresponding factory object to control the lifecycle of these objects.

In the following is given the architecture of an SSP server on CORBA. For the Switching Control, Call Control and Special Resources objects we could have two approaches. In the first approach they are only interface objects between the proprietary Application Program Interface (API) of existing software. In the second approach they would control the hardware directly, what implies providing a CORBA interface to Switching Control, Call Control & Special Resources. In theory this would be the best solution, since the approach would give an overall consistent software architecture, in this case special IDL (Interface Definition Language) adapter interfaces have to be designed.

A SMP (Simple Management Protocol) is responsible for service control and monitoring. In order to be able to control services, the SMP does not need to be a DPE object. What is needed is that the objects that are controlled (e.g., script) provide an interface to do so. For monitoring we need an SMP object that is able to receive 'events' from the objects that are being monitored. In our research prototype we defined and implemented a trace control as an example on what is possible as management functionality on the SCP.

In the previous section we have described a number of possibilities for CORBA objects in an IN Architecture. In this section we will group certain of these CORBA objects into a specific architecture. The sequence of the architectures can be seen as a possible evolution scenario, starting from current day's service provisioning, especially IN, products.

The basis of the first architecture is the usage of a distributed database for data distribution and CORBA distribution for distributed SCP. This architecture is designed to interface with existing SSPs, so the SSP is not a CORBA object. Since this architecture was used to implement a research prototype, we elaborate on it more than the others. FIG. 2 depicts the architecture.

The basic components in the architecture are:
the script: a CORBA object that handles exactly one call
the SLI (Service Logic Interface), a CORBA object that handles a TCAP dialogue for, and interfaces with the SSP.
the distributed DB.

Existing IN service scripts can encapsulated in Script objects.

A Script object also contains the Service Data and Call Context related to a particular call, and one Script object is instantiated per call. The interface of the Script object contains operations that represent the TCAP messages that the Script receives during its execution.

A special Service Logic Interface (SLI) object receives the #7 messages from the SSP and dispatches them to the corresponding script object instantiation, using the ORB services. The interface of the SLI object contains the TCAP messages that can be sent to it. One SLI object is instantiated per call.

Since the Script and SLI objects exist only during the lifetime of a call corresponding factory objects are used to create and destroy them. Data objects are not CORBA objects, they are implemented as C++ objects. This approach hides the use of a particular database from the service logic.

It is possible to use as database for example Oracle, SQLNET or ObjectStore. The SMP has not be considered; we could have used the proprietary mechanism to send status information to it, or defined it as a CORBA object with an appropriate IDL interface.

However as an example on what is possible, its easy possible to design and implement a small trace control system; each server has a tracer object, the trace control part of the SMP can call methods to turn traces on particular implementation objects on and off. The SMP also manages the database (using SQLNET).

A script and a SLI are CORBA objects, how they are distributed over servers is a deployment issue. A CORBA server is a process running at a particular node in the system. There is one SLIServer in the system that interfaces with the SSP. It has one CORBA object, the SLIFactory, that is always present when the server is running.

The main purpose of this object is to create new SLI objects when new calls are started (when a TCAP dialogue is opened). The SLIServer is deployed in the node that has the #7 hardware and software installed. The system can have a number of ScriptServers, one per available node.

This server also has a factory object, that exists during the lifetime of the server itself. This factory object is registered in the CORBA Naming service, so that an SLI can find it. In this way service logic distribution is facilitated. Adding more processing power to the system just means installing the new machine, running the ScriptServer on it, and the next time the SLI looks for a ScriptFactory a new possibility is available. The same mechanism also provides some reliability, when a machine goes down for some reason, the SLI will simply not get a reference to that ScriptServer any more. Note that the ScriptFactory is also to best candidate to put a management interface on (e.g., to change the service characteristics), since it is always available as long as the server is running.

The interface between SLI and Script is defined to be asynchronous and in terms of TCAP primitives (BEGIN, INVOKE, RESULT, . . . ). This option is advantageous, since one of the requirements is to reuse existing IN product software. Another option is to define this interface in terms of INAP primitives.

The difference between a CORBA object, a (CORBA) server and a process must be clear. A CORBA object implements an interface and runs within a CORBA server. The CORBA server itself is one process that runs on a host (or node). This definition is important for the relation between a script and a call. In the current ALCATEL IN product implementation a script is a process that handles different calls, and keeps a different call context for each of those. This is done for performance reasons, starting up a separate process (script) for each call takes some time.

We could adapt a similar approach (one script handles n calls) in these architectures, but the fact that a script has multiple contexts is not that clean and it is possible to deal with the performance issue by having a CORBA server with multiple scripts (each handling one call). So, it is better that in this architecture, a host can run one or more CORBA servers, each running different script objects that each handle a specific call.

The CORBA server is similar to the script in the current IN product, but the problem of handling multiple contexts is shifted from the application programmer to the CORBA platform.

A step further in this sequence of architectures, as second architecture, is to break down the script object into its components. As known, IN services are designed as a number SIBs that are nodes in a service logic graph. The execution of the script means executing SIBs and moving to the next SIB depending on data and responses coming from the SSP. Instead of designing this as a monolithic piece of software (from the SCE), it could be designed in terms cooperating SIBS. As known, the IN capability set 1. SIBs are not sufficiently defined to used them as they are. This resulted in IN platform providers having their own set of SIBs derived from the standard and software from SIBs is not reusable among platforms.

When SIBs are defined as CORBA objects this situation could be broken and service providers would be able to design their own services, reusing existing SIBs (source code).

Having SIBs as independent CORBA objects offers the possibility to execute the SIBs in different places. Instead of getting the data (using a distributed database, or using CORBA objects) to the place where the script or SIB is executed, we could start the SIB on the machine where the data is located. This brings benefits. We can envisage a scheme where there is a control entity (a script) that executes SIBs remotely or a scheme where control is passed from SIB to SIB.

A third architecture breaks with traditional IN product in the sense that it also makes the SSP a CORBA object. In the previous architectures, for reliability reasons, it is still necessary that CORBA servers are deployed on machines that are interconnected on a reliable LAN. In practice, with the current DPE implementations (TCP/IP) this means putting the machines in the same location. This technology restriction prevents putting the SSP on the (Distributed Processing Environment), since in practice SCP and SSP sites are located on different places. However, technology evolves and DPE providers (e.g., IONA) are looking into the possibility of porting their product to other transport protocols, e.g., #7 links for telecommunication purposes. When this happens the step to making the SSP a CORBA object is not that big. In this case, the SLI object would not be needed anymore, since the SSP object could take over its role. When a call is started it gets a reference to a Script-Factory and asks to create the script object itself. It could then communicate with this object directly. Also the language used in this communication (INAP encapsulated in a TCAP based interface) can be simplified. This interface could be defined in terms of INAP primitives (e.g., provide__ instruction(args), join(args)). This would improve (simplify) the system design and implementation, since the TCAP layer disappears for the application programmer. One could say that when CORBA is used, the application programmer must only be concerned with the application layer of the communication, not with the session layer (when TCAP is used).

The final step would be to extend integrate a terminal (as proposed by TINA (Telecommunications Information Networking Architecture)). This would mean a major change in user equipment. However this change is not infeasible if we consider the fact that more and more users get connected to the internet over their telephone lines. And the technology needed to have the DPE extended to the terminal is similar to this. The benefit of this would be that the terminal to network protocol could become much richer than just passing DTMF tones as numbers.

The above described architecture provides a solution to make especially IN platforms more scalable. Since interworking with and evolution from existing products is important we presented a sequence of architectures that can be seen as a possible evolution scenario.

Figure 6:
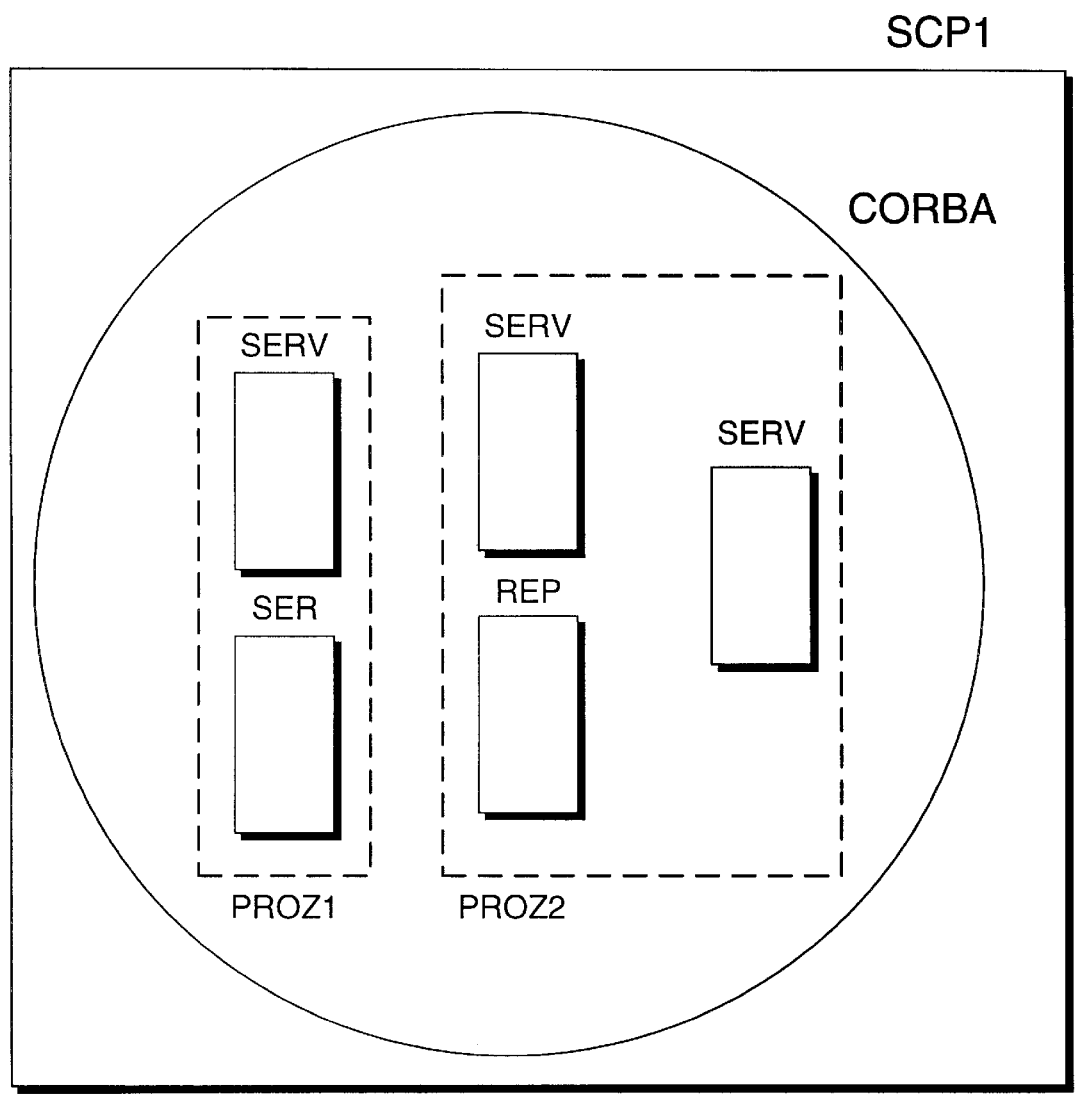
FIG. 6 shows the service control facility SCP1 with several servers SERV and REP that are formed on top of an object infrastructure CORBA ORB in an object oriented environment CORBA.

FIG. 6 shows the service control facility SCP1 with several servers SERV and REP that are formed on top of an object infrastructure CORBA ORB in an object oriented environment CORBA.

The different servers runs on different processing nodes PROZ1 and PROZ2.

Each service that is provided by the SCP1 is implemented by one or many servers SERV. Each call to the service is a single CORBA object managed by one of the corresponding servers SERV through a factory. SSP1 and SSP2 has access to several servers SERV on top of the CORBA ORB. That is, as if they have access to several service control function SCPs. To provide the link a service repository server REP is designed.

Upon request for a new service session, SSP1 accesses the service repository server REP to find an available service server SERV to execute the service session.

Input information to the service repository server is made of the IN service name and a service session key. The matching object reference of the service factory is returned by the service repository server.

A service server is registered into the service repository based on a constraint on the session key. Thus, a key definition language has been defined in offer to process the key definition when registering a new server, and process the key when the SSP performs a query.

As an example an implementation procedure according to the architecture 3 is described in the following:

A Credit Card Calling service which existed for the UNIX based IN Release existing Alcatel product is to be implemented. The Credit Card Call service is a "typical" IN service and allows a call from any terminal to be billed to a particular card number. To set up that call, the user has to enter a card number, a PIN code and the destination number. If the entered data is correct, the call is completed to the destination address and charged to the user's card.

An SSP simulation stub was used to generate the TCAP dialogue for the Credit Card Call. The SSP stub is a CORBA object that sends and receives the same TCAP messages that an SSP would. The SSP stub is capable of simulating different call scenarios, can generate different call loads and can repeat a scenario an arbitrary number of times.

Another general issue for the use of CORBA in an IN oriented service provisioning architecture is the interworking of CORBA-based IN with legacy IN applications.

This interworking can be achieved with the use of Adaptation. It is related to the way a CORBA based infrastructure can communicate with the legacy of switching systems, namely SSPs.

There are two approaches possible:

1) Definition of an Adaptation Unit which is an application level bridge that provide the mapping of SS7 and TCAP primitives into IDL invocations. This approach is similar to one taken by the XoJIDM group (Joint Inter Domain Task of X/Open) for the CORBA/CMIP gateway. The result of their works can be reused especially the static mapping of GDMO/ASN.1 to IDL interfaces (GDMO is an acronym for "Guidelines for the Definition of Managed Objects," and ASN.1 stands for "Abstract Syntax Notation One").

In order to minimize the impact on existing systems, CORBA should provide framework services and tools in order to achieve this mapping. The availability of such framework will allow interworking of CORBA-based IN with a variety of existing hardware such as SCPs and HLRs.

Such application level bridge should be characterized by high availability and high performance without being a bottleneck for a distributed system. However for the required real-time performance, this is an intermediate solution towards full IN CORBA-based systems.

This approach would involve building an IDL interface to represent application level protocols such as MAP and INAP and others which are based on the TCAP layer. The TCAP layer provides a 'ROSE-like' asynchronous RPC service over the SCCP layer. And basing the bridge on TCAP will exclude the use of circuit related signaling protocols such as ISUP and TUP from the solution.

Like in the XoJIDM approach, there should be a static translation of the INAP/TCAP specification to IDL interfaces which will be done by a dedicated compiler. Thus, any INAP dialect can be converted to appropriate IDL interfaces. These applications level bridges would implement these IDL generated interfaces and dynamically perform conversion between IDL-derived types and their ASN.1 equivalents.

CORBA nodes using the protocol specific bridges would generally run two servers, one each for processing outgoing and incoming invocations. Since TCAP is a connectionless service the gateway will have to maintain state in order to match invocations to responses and exceptions.

2) Usage of SS7 as an Environment Specific Inter-ORB protocol (ESIOP):

A possible solution is to map the CORBA GIOP (General Inter-ORB Protocol which makes requests or returns replies between Object Request Brokers) on top of SS7 or to build a new Extended protocol (ESIOP) on top of the SS7 layers.

The ESIOP solution would essentially use an SS7 protocol-as a transport for the GIOP protocol. CORBA objects would be visible across the SS7 network in exactly the same manner as they would be across the Internet with the CORBA IIOP. This would allow as ORB to use existing SS7 infrastructure as transport.

It should be noticed that existing signaling networks were never dimensioned to support the sort of traffic which will be exchanged by CORBA nodes. However, there is a potential benefit in this approach by exploiting the fault tolerant nature of the SS7 network.

The first issue here is the choice of SS7 protocol access level for this solution. The two principal choices are TCAP and SCCP:

GIOP at TCAP level:

It should be possible to use TCAP for carrying GIOP messages since IT is essentially a ROSE-like service. Services which make use of TCAP must define their operations using ASN.1 modules. It is envisaged that ASN.1 macros would be used to define the operation set: Request, Reply, CancelRequest, LocateRequest, LocateReply, CloseConnection and MessageError. These operations correspond to the GIOP primitives. The gateway would be responsible for converting CDR format, of the form used by GIOP, into a form transportable using ASN.1 types (possibly as an opaque buffer with BER encoding).

While it should be possible in principle to use TCAP as the basis for the ESIOP, it is not suitable because of:

the complexity of the implementation.

the overhead incurred in by the TCAP layer in addition to basic transport the asynchronous nature of the protocol.

ESIOP at SCCP level:

The other choice for implementing the SS7 ESIOP is at the SCCP level. The SCCP provides services corresponding to the OSI-RM network layer functionality. It can operate in both connection-oriented and connectionless mode. It should be feasible to use the SCCP to transport GIOP messages although the ESIOP code may be required to perform its own transport layer functions (e.g., end-to-end flow-control and segmentation/re-assembly). It should be possible to address CORBA nodes using the "Global Title" mode of SCCP addressing. It would appear that using SCCP as the basis for an ESIOP for the SS7 network would be the best approach.

The following requirements are advantageous for an object oriented environment for an infrastructure in which a service session object interacts (described by hand of the CORBA environment):

In terms of functional requirements, CORBA should provide:

asynchronous Invocation model and support for group communication in the ORB;

proper hooks for extending the ORB with security, transaction and replication mechanisms;

node management and minimal object lifecycle facilities;

a time service and native monitoring facilities for capturing both computational and engineering events;

support for multithreading with flexible event-to-thread mappings.

The non-functional requirements of CORBA are concerned with identifying the level of salability and object granularity that the ORB should meet in the IN context;

identifying the performance level that the ORB must achieve in terms of latency, throughput, etc.;

providing a predictable ORB core by instrumenting and documenting the time behavior of the platform;

reliability which denotes requirements that define acceptable behaviors for the distributed applications in the presence of hardware and software failures. In this case two types of reliability can be identified; the integrity state and the availability;

manageability which denotes requirements that enable ease of development, deployment and operation for complex applications. In this case maintainability, (re) configurability and extensibility of CORBA applications.

An asynchronous Invocation model commonly used by IN applications. Thus, asynchronous and optionally isochronous invocation model is required with the ORB. The requirement here is a client side programming model which potentially supports a lightweight asynchronous communication mechanism incorporating a mandatory callback (or ORB "upcall" type mechanism) and optionally a "Futures" type programming model.

For the same object, both asynchronous and synchronous models should co-exist. The maximum concurrency level is defined in the configuration (e.g., QoS parameters), and has to be controllable, with the possibility of queuing the request or returning an exception.

A basic fault detection support should be provided by the ORB runtime for any object which needs it. This can be done by a timer which is implicit set and managed in the client process.

Flexibility and scalability:

The ORB should be able to support applications handling a large number of objects and should be able to support many simultaneous connections to remote objects.

The memory cost of an unused remote interface reference in a given capsule (i.e., Unix process) should be of the order of a standard language pointer.

A typical telecommunications environment comprises objects of very different granularities in both space (memory size) and time (object lifetime and duration). A scalable ORB should support objects at different levels of granularity, and minimize the overhead associated with the handling of small and volatile objects and of connections to remote objects.

To achieve some of the ORB fault-tolerance and reliability, the CORBA object model could be enhanced to support groups of objects or globally known as group communication such as those described Reliability and availability:

To achieve the reliability requirements, the notion of replicated distributed objects can be introduced in CORBA. Thus the critical components of the application are implemented through replicated objects. This replica management can be handled automatically by the ORB such that clients interacting with a given server object is not aware if it is replicated or not. The degree of replication can be determined by the desired level of reliability which can be measured with the number of maximum number of concurrent failures; the nature of the failure which can be typed (malicious or benign); and the type of reliability property being sought such as integrity or availability. High availability or Fault Tolerance capabilities should be provided by CORBA for distributed IN systems in order to ensure the same robustness as current IN systems.

Timeliness requirements can be also achieved by the replica service. For example, applications that need to have bounded and predictable delays will be implemented through replicated objects. Each replica is able to process locally all of the methods defined for the object. In the absence of failure, a client can use any of the responses to a method Invocation as its result, (the invocations in this case is perform synchronously).

To achieve this, the ORB will have a modular structure allowing the implementation of different profiles, depending on application or services requirements. These profiles give an abstraction of the resources provided by the underlying operating system. One of the ORB module will be a failure detector which is at the lower level of the ORB structure. And a response Invocation delay beyond a certain threshold are classified as failure. Thus, the client is able to trade off reliability for timeliness, the shorter the threshold, the tighter the bounds on delays. By replicating an object in a sufficient number of times, the client is able to meet both timeliness and reliability requirements simultaneously.

Here, we have identified a requirement for a replication service with correctness, safety and liveness properties; and a failure detector module which is part of the ORB core.

Performance:

Performance of IN are measured in number of calls per second for service nodes and intelligent peripherals; and number of transaction per second for signaling control point. These calls and transactions may involve multiple messages exchanged between an SSP and the Intelligent Layer.

To obtain the actual performance of legacy IN systems, real-time performance of the ORB is required for the use of distributed processing in IN systems as well as its distribution on a geographical scale (non centralized IN systems). To achieve better performance for IN distributed systems, the ORB call overhead should be reduced, and the performance level that the ORB must achieve in terms of latency, throughput, etc. should be defined and documented.

What is claimed is:

1. A method for providing at least one service to users of a telecommunication network, in which method service calls requesting the execution of the service for an respective one of the users are routed to a service switching exchange of the telecommunication network or are respectively routed to one of several service switching exchanges of the telecommunication network and in which method a corresponding service request is sent by the respective service switching exchange, that has received the respective service call, to a service control facility, characterized in that the service request is routed to a particular one of a plurality of servers of the service control facility, which are formed on top of an object infrastructure within an object oriented computing environment, that the particular server acts as service repository server and determines another one of the plurality of servers that is available and able to execute the control of the service for the respective service call.

2. A method as claimed in claim 1, characterized in that different services are provided by the service control facility and that a service logic function for each of these different services is implemented within one or several of the servers.

3. A method as claimed in claim 1, characterized in that the particular server determines an object reference of a service factory object that creates a service session object which is able to control the execution of the service for the respective service call, said factory object being an object which provides the function of creating a specific kind of object.

4. A method as claimed in claim 1, characterized in that a service session object, which manages a service session, is managed by one of the servers through a factory object.

5. A method as claimed in claim 1, characterized in that for each service request one service session object, which is able to interact and communicate via an object infrastructure with other objects in a object oriented computing environment, is created and the respective service session object controls the execution of the service for the respective service call.

6. A method as claimed in claim 1, characterized in that the particular server receives as input data a name and a service session key and returns a matching object reference of a service factory object, wherein said session key is a key used for just one message or set of messages.

7. A method as claimed in claim 1, characterized in that the other servers are registered into the particular server based on a constraint of a session key.

8. A method as claimed in claim 1, characterized in that the particular server performs load balancing between the servers that implementing the same service.

9. A method as claimed in claim 1, characterized in that the or each service switching exchange of the telecommunication network communicates with the or each service control facility according to the communication protocols of the Intelligent Network Architecture.

10. A method as claimed in claim 1, characterized in that the plurality of servers is formed on top of CORBA object infrastructure.

11. A method as claimed in claim 1, characterized in that the creation of each service session object is managed through a factory object.

12. A method as claimed in claim 7, characterized in that the factory object implements a life cycle policy for the service session object, wherein the factory object creates the service session object and destroys the service session object when the service session object's life cycle is over.

13. A method as claimed in claim 7, characterized in that the factory object implements a creation on demand life cycle policy for the service session object.

14. A method as claimed in claim 7, characterized in that the factory object implements activation on demand life cycle policy for the service session object.

15. A method as claimed in claim 1, characterized in that the service session object has, as its interface definition, TCAP mapped over IDL.

16. A method as claimed in claim 1, characterized in that the service session object receives directly its own message invocations.

17. A method as claimed in claim 1, characterized in that the service session object receives INAP messages from the or each service switching exchange as message invocations.

18. A method as claimed in claim 1, characterized in that each service session object runs in its own thread.

19. A method for provisioning the execution of service logic functions within a service control facility of a telecommunication systems, where service requests, that request the execution of a service logic function, are received by the service control facility from at least one service switching exchange of the telecommunication system, characterized in that the service request is routed to a particular one of a plurality of servers of the service control facility, which are formed on top of an object infrastructure within an object oriented computing environment, that the particular server acts as service repository server and determines another one of the plurality of servers that is available and able to execute the respective service request.

20. A service control facility for connecting to one or several service switching exchanges of a telecommunication network, where the service control facility contains means for receiving service requests, that request the execution of a service for a user of the telecommunication network, from at least one of the service switching exchanges of the telecommunication network, characterized by containing a plurality of servers, which are formed on top of an object infrastructure within an object oriented computing environment, containing means for routing the service request to a particular one of the service control facility, and containing the particular server acting as service repository server and determining another one of the plurality of servers that is available and able to execute the respective service request.

21. The service control facility according to claim 16, characterized by containing a variable number of processing nodes processing the plurality of servers.

22. A server node for a service control facility connected to one or several service switching exchanges of a telecommunication network, where the server node contains means for receiving service requests, that request the execution of a service for a user of the telecommunication network, from at least one of the service switching exchanges of the telecommunication network, characterized by that the server node is formed on top of an object infrastructure within an object oriented computing environment, and containing means for determining another one of a plurality of server nodes which are formed on top of the object infrastructure within the object oriented computing environment, that is available and able to execute the respective service request.

* * * * *